Apr. 3, 1923.

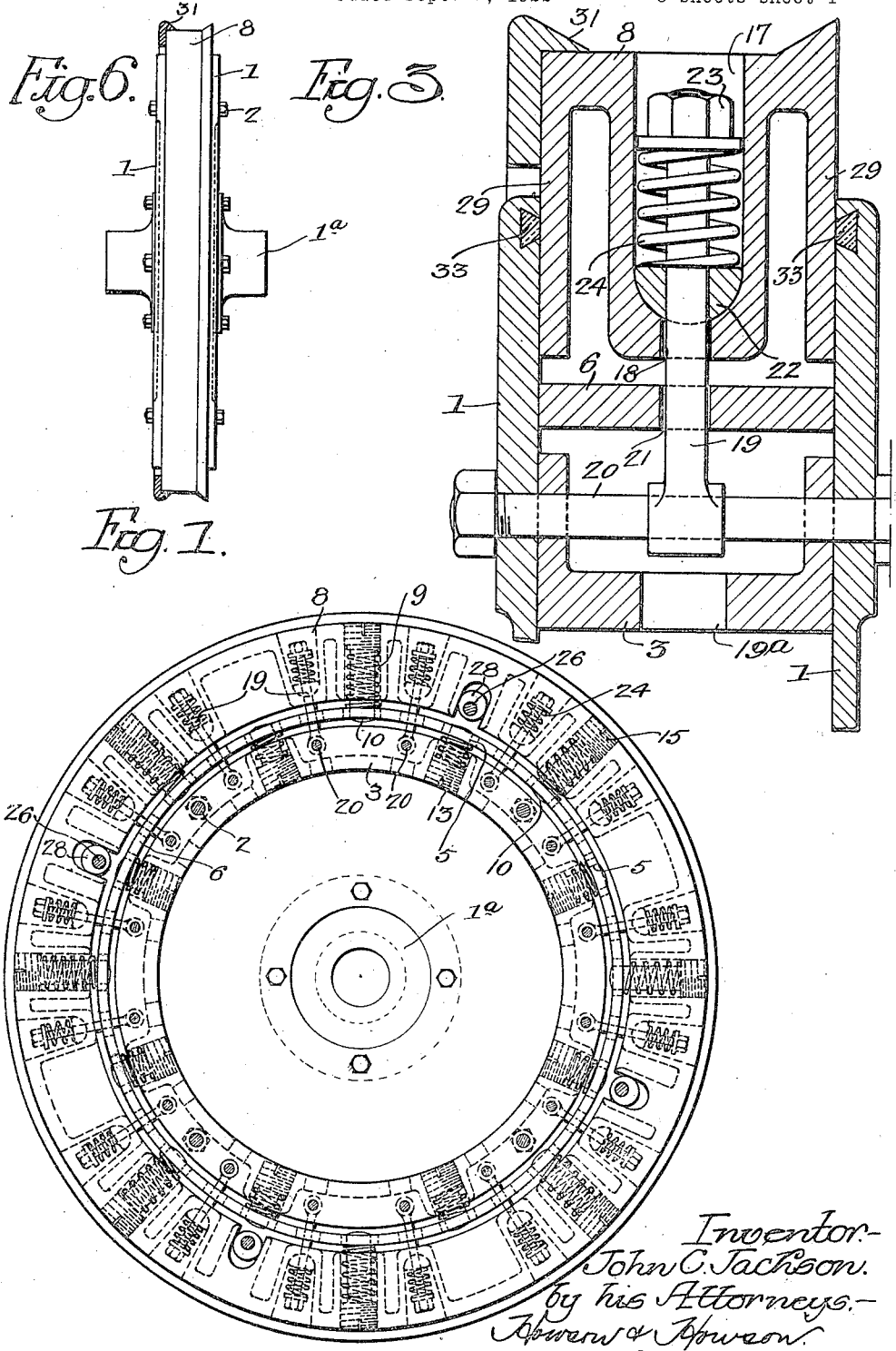

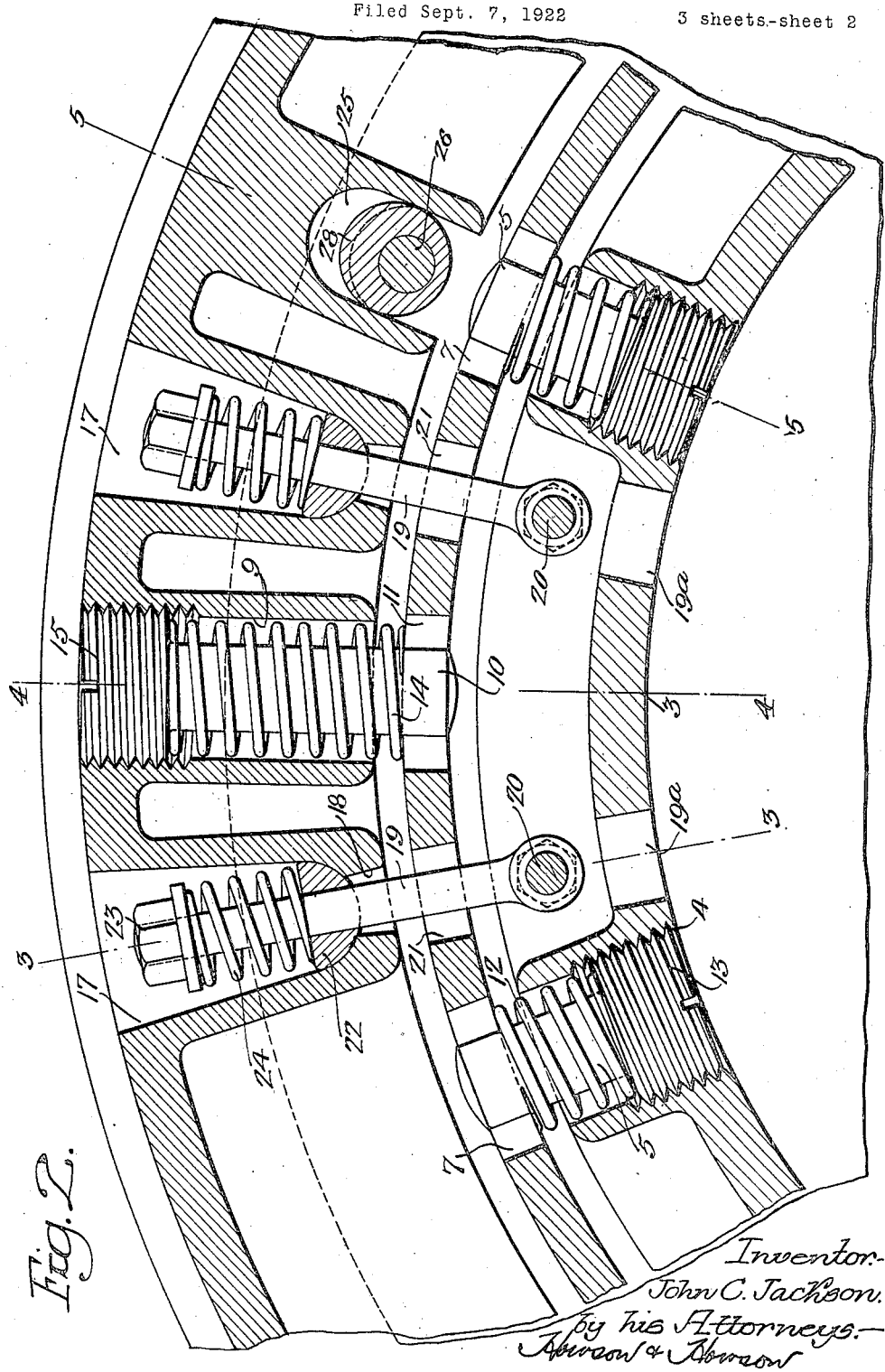

J. C. JACKSON 1,450,778

RESILIENT WHEEL

Filed Sept. 7, 1922

Inventor.—
John C. Jackson.
by his Attorneys.—

Patented Apr. 3, 1923.

1,450,778

UNITED STATES PATENT OFFICE.

JOHN C. JACKSON, OF PHILADELPHIA, PENNSYLVANIA, ASSIGNOR OF ONE-FOURTH TO HARRY GRASER, OF WISSAHICKON, PHILADELPHIA, PENNSYLVANIA.

RESILIENT WHEEL.

Application filed September 7, 1922. Serial No. 586,711.

*To all whom it may concern:*

Be it known that I, JOHN C. JACKSON, a citizen of the United States, residing in Philadelphia, Pennsylvania, have invented a Resilient Wheel, of which the following is a specification.

My invention relates to resilient wheels of the type employed with motor vehicles and the like, the object of the invention being the provision of a resilient wheel of novel construction and great efficiency in operation.

In the attached drawings:

Figure 1, is a side view of a wheel made in accordance with my invention having one of the side plates removed;

Fig. 2, is a fragmentary sectional view taken on a plane perpendicular to the axis of the wheel;

Fig. 3, is a section on the line 3—3, Fig. 2;

Figure 4:
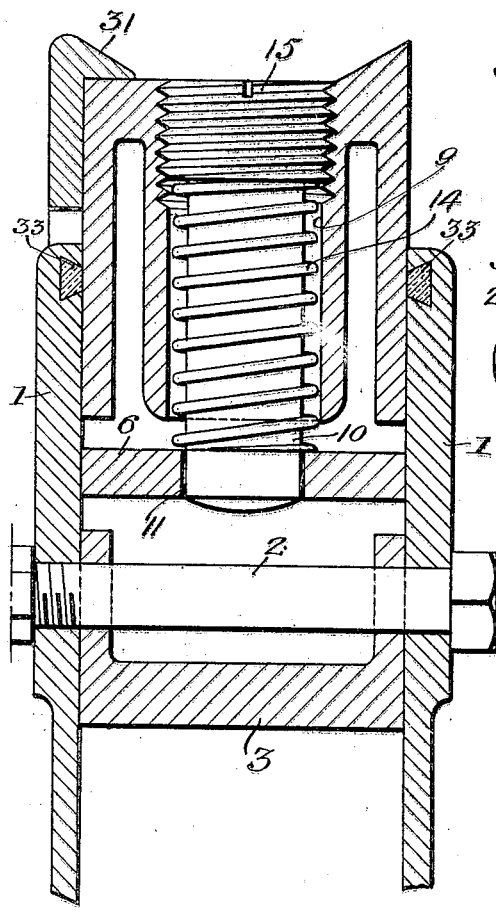
Figure 5:
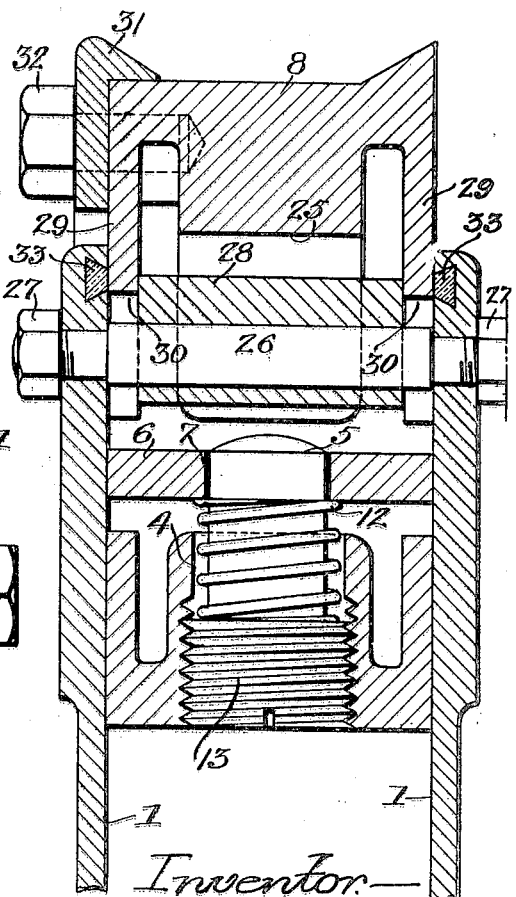

Figs. 4 and 5, are respectively sections on the lines 4—4 and 5—5, Fig. 2, and

Fig. 6, is a view of the wheel assembled.

With reference to the drawings, the wheel comprises a pair of centrally apertured circular side plates or disks 1, 1, which constitute, in effect, the spokes of the wheel and to which are bolted hub elements 1ª, as shown in Figs. 1 and 6. Concentric with the side plates 1, 1, and secured therebetween by means of bolts 2, is a base ring 3 in which are radial sockets or openings 4 for a set of pins or studs 5. These elements 1ª with the plates 1 and base ring 3 constitute a rigid hub structure adapted for mounting in the usual manner upon an axle and in which are mounted the elements which give the wheel the desired resiliency, as hereinafter described.

Established between the side plates 1, 1, and outwardly of the ring 3 is an intermediate ring 6 having evenly spaced around the circumference thereof a series of apertures 7 through which the said pins 5 extend. Also established between the side plates 1, 1, and outwardly of the intermediate ring 6 is an outer ring 8, said ring 8 normally extending beyond the edge of the side plates 1, 1, and having therein a series of sockets or openings 9 for the reception of pins or studs 10.

As clearly illustrated in the drawings, the intermediate ring 6 is also provided with a series of evenly spaced apertures 11 for the reception of the inner ends of the pins 10. A series of coiled springs 12 is mounted upon the pins 5, and is confined between the threaded base 13 of the pins and the inner surface of the ring 6, while a corresponding series of springs 14 mounted upon the pins 10 is confined between the threaded base 15 of the latter and the outer face of the intermediate ring 6. The springs 12 and 14 tend to maintain the intermediate and outer rings concentric with each other and with the inner fixed ring 3.

As illustrated, the openings 4 and 9 extend through the respective rings and are in part threaded for reception of the enlarged and threaded bases of the pins 5 and 10. It will be apparent that the adjustability of the pins in the openings provides a means for regulating the tension of the springs 12 and 14.

A series of sockets 17 is formed in the outer face of the outer ring 8, these latter sockets having at the bottom apertures 18 through which extend arms 19 pivotally mounted at their inner ends upon studs or bolts 20 which extend through the flanged sides of the base ring 3 and through the side plates 1, 1, as shown in Fig. 3, said bolts thereby constituting not only a pivot for the said arms 19 but also assisting in securing together the base ring 3 and the side plates 1, 1.

The arms 19 extend outwardly from their pivots in substantially radial direction to the base ring 3 through apertures 21 in the intermediate ring 6 and through the aforesaid openings 18 in the bottom of the sockets 17, and project into the latter. The arms further pass through a hemispherical bearing element 22 established in the bottom of each of the said sockets 17, and there is confined between each of the said bearing elements 22 and a nut 23 on the outer threaded end of the arm 19 a spring 24. The arm 19 by means of the aforesaid associated elements and the spring 24 constitutes a further link between the base ring 3 and the outer ring 8, and tends to maintain constant the angular relation between these two rings.

As shown in Figs. 2 and 3, the inner ring 3 is provided with properly spaced openings 19ª for passage therethrough of the arms 19 in assembling the structure. As best illustrated also in Fig. 2, each of the openings 7, 11, 18 and 21, is slotted in a circumferential direction of the rings, thereby to permit limited movement of the various rings with respect to each other in a circumferential direction.

The outer ring 8 further has extending outwardly in a substantially radial direction from the inner face thereof a series of lateral recesses 25, through each of which extends a pin 26, the ends of which are of reduced diameter and project through apertures in the side plates 1, 1, the reduced end portions of the pin 26 being threaded for the reception of retaining nuts 27. Each of the pins 26 has rotatably mounted thereon and occupying the respective recesses 25 an eccentric cylinder 28, the diameter of the cylinders being substantially the same as the width of the recesses 25 which they occupy.

As best shown in Fig. 5, the recess 25 does not extend to the side flanged portions 29 of the outer ring 8, these side flanges being, however, recessed at 30 for the passage of the pins 26 therethrough, the eccentric cylinders 28 being confined between the side flanges 29, 29.

The periphery of the outer ring 8 is adapted to receive a rubber tread of any desired type but preferably of hard rubber, and a ring flange 31 is provided which is bolted to one side of the said outer ring by means of studs 32 for retaining the tread in place. Packing glands 33 are preferably provided on the inside of the side plates 1, 1, to make a substantially tight joint between the sides of the outer ring 8 and the said plates 1, 1, thereby to prevent the entrance of moisture and dust.

In operation, the springs 12 and 14, as previously described, tend to maintain the intermediate and outer rings in a normal spaced and concentric relation, while at the same time permitting movement therebetween, the pins 5 and 10 tending to maintain the intermediate and outer rings in lateral alignment against lateral thrust, while at the same time not interfering with a limited amount of relative circumferential movement. This circumferential movement of the outer ring is controlled by the arms 19 and the springs 24, the latter exerting a pressure at all times tending to hold the outer ring in a relatively fixed position with respect to the base ring 3, but permitting a limited circumferential movement. The circumferential movement of the outer ring is further controlled by the eccentrics 28, which also by controlling the movement of the outer ring reinforces the entire structure.

I have found that the herein described construction fully meets the requirements of a resilient wheel of the type involved, although it will be understood that the wheel as illustrated is subject to considerable modification without departure from the essential features of the invention. It may in some cases, for example, be desirable to eliminate the eccentric cylinders 28 and to rely entirely upon the springs and other interconnecting elements to control the movement of the outer ring 8.

Considerable latitude in the resiliency of the wheel is afforded by means of the adjustments provided for the springs, and these latter can accordingly be adjusted to the point giving a maximum efficiency and resiliency within the required strength.

I claim:

1. A resilient wheel comprising hub elements, a ring resiliently mounted on said hub elements, an outer tread bearing ring resiliently connected with said inner ring, and resilient means controlling the circumferential movement of the said outer ring with respect to the hub elements.

2. In a resilient wheel, the combination with a hub structure, of a ring mounted in said hub structure, springs confined between the inner surface of the said ring and the hub structure, an outer ring, springs confined between the outer ring and the inner ring, and means for regulating the tension of said springs to control the relative movement of the outer and inner rings with respect to each other and to the hub structure.

3. In a resilient wheel, the combination with a hub structure, of a base ring having sockets therein, a pin mounted in each of said sockets, an inner ring having apertures through which said pins project, springs confined between the inner ring and the bottom of said sockets, an outer ring having a plurality of sockets on the inside thereof, pins in the last named sockets adapted to project through apertures in said inner ring, springs confined between the bases of the last named sockets and the outer face of the inner ring, the apertures in said inner ring through which the respective pins project being elongated in a circumferential direction to permit limited angular movement of the said rings with respect to the hub structure, and resilient means tending to prevent relative circumferential movement of the outer ring with respect to the hub structure.

4. In a resilient wheel, the combination with a hub structure, a base ring having a plurality of sockets therein, a pin mounted in each of said sockets, an inner ring having apertures through which said pins project, springs confined between the inner ring and the bottom of said sockets, an outer ring having a plurality of sockets on the inside thereof, pins in the last named sockets adapted to project through apertures in said inner ring, springs in the last named sockets confined between the bases of the latter and the outer face of the inner ring, the apertures in said inner ring through which the respective pins project being elongated in a circumferential direction to permit limited angular movement of the said rings with respect to the hub structure, arms pivotally mounted on the hub structure and extending outwardly therefrom, and resilient means establishing connection between said arms and the outer ring and tending to prevent circumferential displacement of the latter with respect to the hub structure.

5. A resilient wheel comprising a hub structure, an inner ring, resilient means tending to maintain said inner ring concentric with the hub structure, an outer ring, resilient means tending to maintain the outer ring concentric with the said inner ring, and means comprising eccentric elements pivotally secured to the hub structure for preventing excessive circumferential displacement of the outer ring with respect to the hub structure.

6. A resilient wheel comprising a hub structure, an inner ring mounted in said hub structure, resilient means tending to maintain the inner ring concentric with the hub structure, an outer ring, resilient means tending to maintain the outer ring concentric with the inner ring, resilient means tending to prevent circumferential displacement of the outer ring with respect to the hub structure, recesses in said outer ring, pins secured in the hub structure and extending through said recesses, and eccentric cylinders mounted on said pins and occupying said recesses.

7. A resilient wheel comprising a pair of hub-bearing side plates, a base ring detachably secured between said side plates and concentric with the hub, an intermediate ring of diameter larger than the said base ring, resilient means tending to maintain the intermediate ring concentric with the base ring, an outer ring, resilient means tending to maintain the outer ring concentric with the intermediate ring, and resilient means tending to prevent circumferential movement of the outer ring with respect to the base ring.

8. In a resilient wheel, the combination with a hub structure, of an inner ring mounted therein, resilient means tending to maintain the inner ring concentric with the hub structure, an outer ring, resilient means tending to maintain the outer ring concentric with the inner ring, sockets in said outer ring extending inwardly from the periphery thereof, arms pivotally mounted in the hub structure and extending outwardly into the said sockets, bearing elements on said arms adapted to loosely occupy the bottom of the sockets, a nut on the outer end of said arms, and a spring confined between the nuts and the bearing elements and tending to maintain the outer ring circumferentially fixed with respect to the hub structure.

9. In a resilient wheel, the combination with a hub structure having a plurality of radial threaded sockets, pins having each a threaded enlarged base adapted to occupy the said sockets, an inner ring having circumferential slots for the reception of the outer end of said pins, springs on said pins confined between the said ring and the enlarged bases of the pins, an outer ring, resilient means tending to maintain the outer ring concentric with the inner ring, and resilient means tending to prevent circumferential movement of the outer ring with respect to the hub structure.

10. In a resilient wheel, the combination with a hub structure comprising a base ring, radial sockets in said base ring extending inwardly from the periphery thereof, an intermediate ring, an outer ring having radial sockets extending outwardly from the inside thereof, pins mounted in the sockets of both the inner and outer rings and projecting respectively outwardly and inwardly through circumferential slots in the intermediate ring, springs on the pins bearing respectively against the inner and outer faces thereof, and means for controlling the position of the pins in their sockets, thereby to regulate the pressure of said springs upon the intermediate ring.

JOHN C. JACKSON.